(12) United States Patent
Buchanan et al.

(10) Patent No.: US 7,819,325 B2
(45) Date of Patent: Oct. 26, 2010

(54) METHOD OF CALIBRATION DATA TRANSFER

(75) Inventors: Mark Buchanan, Rochester Hills, MI (US); William Vukovich, White Lake Township, MI (US); Melissa Koenig, Howell, MI (US)

(73) Assignee: BorgWarner, Inc., Auburn Hills, MI (US)

( * ) Notice: Subject to any disclaimer, the term of this patent is extended or adjusted under 35 U.S.C. 154(b) by 984 days.

(21) Appl. No.: 11/209,107

(22) Filed: Aug. 22, 2005

(65) Prior Publication Data

US 2006/0047397 A1 Mar. 2, 2006

Related U.S. Application Data

(60) Provisional application No. 60/606,860, filed on Sep. 2, 2004.

(51) Int. Cl.
*G06K 7/10* (2006.01)
(52) U.S. Cl. .............. 235/462.01; 701/29; 701/31; 701/35; 701/51; 701/56; 340/453; 235/491
(58) Field of Classification Search ............ 235/462.01, 235/491; 701/29, 31, 35, 51, 56; 340/453
See application file for complete search history.

(56) References Cited

U.S. PATENT DOCUMENTS 5,255,641 A * 10/1993 Schechter ............... 123/90.11
5,376,058 A * 12/1994 Ueda ..................... 477/160
2003/0187562 A1* 10/2003 Ishii et al. .................. 701/51
2004/0186637 A1* 9/2004 Isogai et al. ................ 701/29

OTHER PUBLICATIONS

"What is a Barcode?", Mecco Marking & Traceability, http://www.meccomark.com, Aug. 31, 2004.
"PDF417: The New Symbol of Data Management", Symbol Technologies, http://www.symbol.com, Aug. 30, 2004.
"PDF417 Barcode FAQ & Tutorial", IDAutomation.com, Inc., http://www.idautomation.com, Aug. 30, 2004.

* cited by examiner

*Primary Examiner*—Michael G Lee
*Assistant Examiner*—Kristy A Haupt
(74) *Attorney, Agent, or Firm*—Warn Partners, P.C.

(57) ABSTRACT

Calibration data transfer systems are described for use in conjunction with, for example, automotive components such as but not limited to transmission systems. The systems employ devices, such as but not limited to barcode systems such as 2D barcodes, radio frequency identification devices (RFID), digital data storage systems such as CD-ROM's, and the like, to record and/or store data thereon. The data can include information, such as but not limited to solenoid calibration curve coefficients and the like. The data contained on these devices can be accessed by a data retrieval system, such as a scanner, and transferred, for example, to a transmission control unit.

14 Claims, 4 Drawing Sheets

METHOD OF CALIBRATION DATA TRANSFER

CROSS-REFERENCE TO RELATED APPLICATION

The instant application claims priority to U.S. Provisional Patent Application Ser. No. 60/606,860 filed Sep. 2, 2004, the entire specification of which is expressly incorporated herein by reference.

FIELD OF THE INVENTION

The present invention relates generally to data transfer methods, and more particularly to calibration data transfer systems for use in conjunction with, for example, automotive components such as but not limited to transmission systems.

BACKGROUND OF THE INVENTION

Solenoids have been used to provide a number of functions in automotive applications including, but not limited to automotive transmission systems. Solenoids are typically required to exhibit fairly precise current/pressure performance characteristics (e.g., solenoid characteristic curve coefficients) so as to be operationally compatible with the design and/or operating conditions of the other components of the vehicle, including but not limited to those of the transmission system. This is especially true with respect to recently developed transmission systems that rely heavily on solenoids for clutching functions, such as BorgWarner's Dual Clutch Transmission (DCT) system.

Some manufacturers and/or assemblers do not employ any calibration techniques on the transmission modules containing solenoid(s) therein. While this does not involve any need for data transfer, and the module is serviceable, there may be resulting wide variations in the solenoid characteristic curves. This may adversely affect solenoid performance, and thus affect the overall performance of the vehicle. Accordingly, there has been increased interest in the automotive industry with respect to the calibration and/or transfer of solenoid characteristic curve coefficients.

One method includes what is generally referred to as autonomous calibration, i.e., a transmission control unit (TCU) "sweeps" solenoid current and measures pressure with on-board sensors. While this method does not involve any need for data transfer, and the module is serviceable, it does require on-board sensors for each and every solenoid, as well as requiring a calibration algorithm for the TCU.

Another method includes what is generally referred to as original equipment manufacturer (OEM) end-of-line calibration, i.e., the manufacturer performs the calibration function once the TCU and valve body are assembled together. While this method involves the use of supposedly pre-existing test equipment and established methodology, it does require the OEM to perform the testing and program the TCU, and the TCU and valve body must remain together and thus the module is not serviceable. More specifically, the entire module must be replaced, as individual solenoids are not serviceable.

Still another method includes what is generally referred to as supplier end-of-line calibration, i.e., the supplier, as opposed to the OEM, performs the calibration function once the TCU and valve body are assembled together. While this method also involves the use of supposedly pre-existing test equipment and established methodology, it does require the OEM to send the module to the supplier, as well as requiring the supplier to perform the testing, and the TCU and valve body must remain together and thus the module is not serviceable. More specifically, the entire module must be replaced, as individual solenoids are not serviceable.

Therefore, there exists a need for new and improved calibration data transfer systems and methods for using the same, especially with respect to solenoids employed in transmission systems.

SUMMARY OF THE INVENTION

In accordance with the general teachings of the present invention, new and improved calibration data transfer systems and methods for using the same are provided.

In accordance with a first embodiment of the present invention, a calibration data transfer system is provided, comprising: (1) a data storage device associated with an electromechanical component, wherein the data includes at least one operational parameter of the electromechanical component; and (2) a data retrieval system for retrieving the data from the device.

In accordance with a second embodiment of the present invention, a calibration data transfer system is provided, comprising: (1) a data storage device associated with a solenoid, wherein the data includes at least one operational parameter of the solenoid; and (2) a data retrieval system for retrieving the data from the device, wherein the data storage device is selected from the group consisting of barcodes, radio frequency identification devices, digital data storage devices, databases, and combinations thereof.

In accordance with a third embodiment of the present invention, a method for transferring calibration data is provided, comprising: (1) providing a data storage device associated with an electromechanical component, wherein the data includes at least one operational parameter of the electromechanical component; and (2) providing a data retrieval system for retrieving the data from the device.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
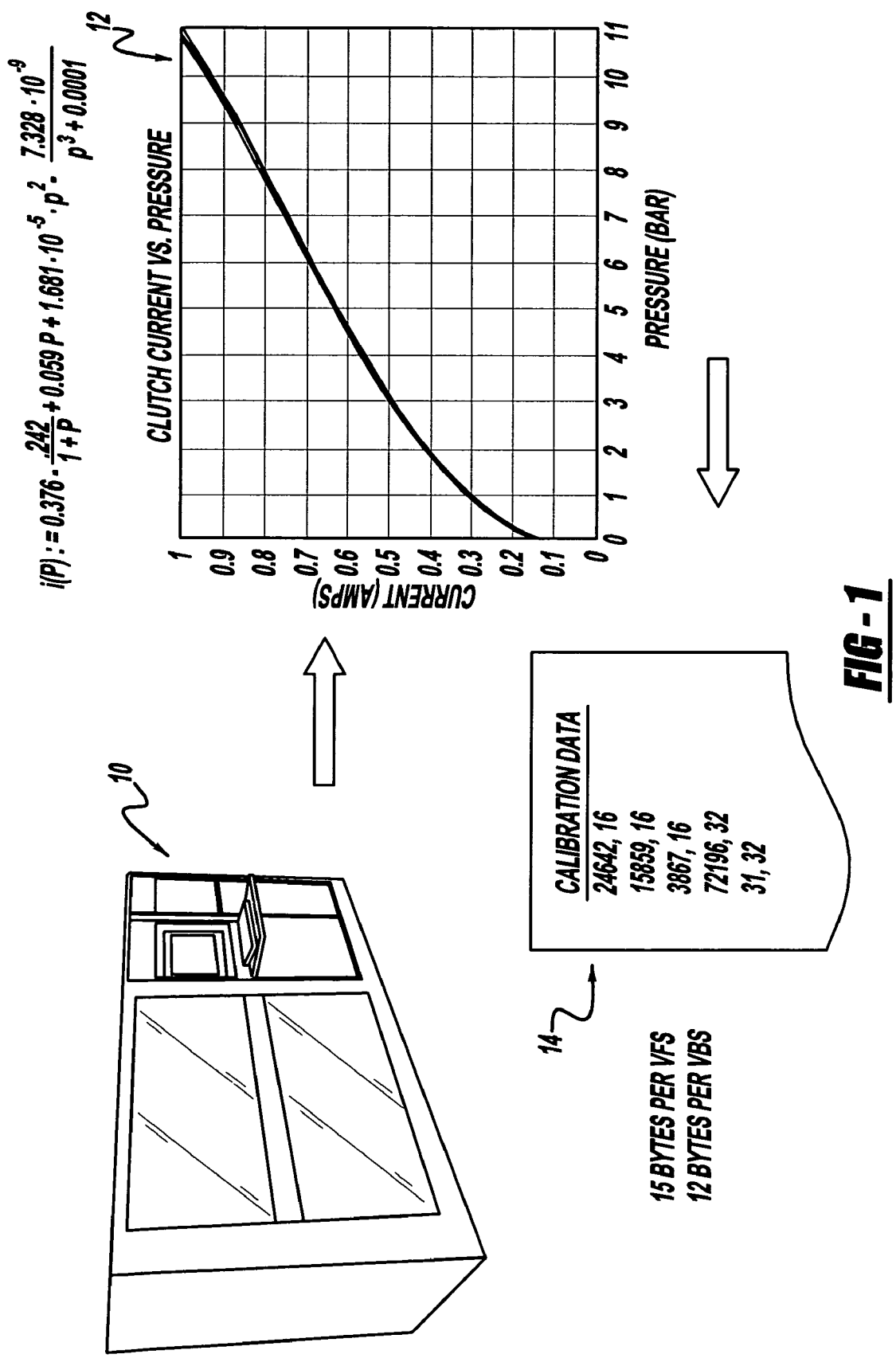
FIG. 1 illustrates the primary aspects of conducting a solenoid sweep to obtain calibration data, in accordance with a first embodiment of the present invention.

The following description of the preferred embodiment(s) is merely exemplary in nature and is in no way intended to limit the invention, its application, or uses.

Accordingly, although the following description of the preferred embodiments relates primarily to solenoids (e.g., variable force and/or variable bleed solenoids), such as those employed in transmission systems (e.g., DCT systems), it should be appreciated that the present invention can be practiced with any type of device, component, and/or system, especially wherein the performance characteristics thereof are preferably contained within a fairly narrow operational range. More specifically, the present invention can be practiced with any type of electromechanical device, component and/or system, especially wherein the performance characteristics thereof are preferably contained within a fairly narrow operational range. By way of a non-limiting example, the present invention can be practiced with clutch systems, transfer case systems, exhaust gas recirculation systems, turbocharger systems, emission systems, cooling systems, and the like. Further, the present invention can also be practiced with non-automotive devices, components, and/or systems, as well.

By "calibration data transfer system," as that phrase is used herein, it is meant any system for transferring data, by any method, from one device, component, system, location and/or the like to another device, component, system, location, and/or the like. The data can include information regarding calibration of any device, component, and/or system, as well as any other type of information.

By "data storage device," as that phrase is used herein, it is meant any device, component, and/or system for storing and/or transmitting data, regardless of informational content. By way of a non-limiting example, the data storage device can include, without limitation, barcodes (e.g., 2D barcodes and/or the like), radio frequency identification devices (RFID's), digital data storage devices (e.g., computer chips, CD's, CD-ROM's, DVD's, and/or the like), databases, and/or the like.

By "associated with an object," as that phrase is used herein, it is meant any association, whether physical or not, between the data storage device and the object.

By "data retrieval system," as that phrase is used herein, it is meant any device, component, and/or system for retrieving, storing, analyzing, reading, interpreting, relaying, transferring, and/or the like, from the data from the data storage device. By way of a non-limiting example, the data retrieval system can include, without limitation, receivers, scanners, interrogators, and/or the like.

By "operational parameter," as that phrase is used herein, it is meant any characteristic, whether related to the structure, function, operation and/or the like, of the object. By way of a non-limiting example, the operational parameter can include, without limitation, a solenoid characteristic curve coefficient and/or the like. A solenoid characteristic curve is generally represented by a polynomial equation, in terms of coefficients multiplied by the powers of the independent variable that defines the solenoid output pressure with respect to the supplied current.

In accordance with the general teachings of the present invention, calibration data transfer systems and methods for using the same are provided, especially those suitable for use with solenoids, especially those employed in conjunction with transmission systems.

In accordance with a preferred embodiment of the present invention, information or data concerning the solenoid, such as but not limited to the solenoid characteristic curve coefficient, is preferably retrievably stored in a data storage device.

In accordance with another preferred embodiment of the present invention, the data storage device is preferably selected from the group consisting of barcodes, radio frequency identification devices, digital data storage devices, databases, and combinations thereof.

In accordance with still another preferred embodiment of the present invention, the data is preferably retrievable by a data retrieval system, wherein the data retrieval system is preferably selected from the group consisting of receivers, scanners, interrogators, and combinations thereof.

The data storage device is preferably associated with the object that is of interest. For example, the solenoid is operably associated with a valve body of a transmission module. Accordingly, the data storage device is preferably affixed, either permanently or non-permanently, to a surface of either the object, or a related object, either in proximity or not in proximity, to the object of interest. By way of a non-limiting example, as it is may be difficult to place and/or access a data storage device directly onto a solenoid, the data storage device can be placed upon a surface of a valve body, cap, connector, housing, flange, or like device. By way of a non-limiting, the solenoid or a plurality of solenoids can be placed into a solenoid housing, which would be operable to have a data storage device affixed thereto. Alternatively, the data storage device can be placed in another location, such as a glove compartment, a surface of the hood, trunk, or like device, a fuse compartment panel, and/or the like. In the case where the data storage device is a database (e.g., a print or virtual version of the solenoid characteristic curve coefficients) or a digital data storage device (e.g., a CD-ROM containing the solenoid characteristic curve coefficients), these devices can be provided separately from the object of interest.

In accordance with one aspect of the present invention, barcodes are employed as the data storage device. Barcodes are a method of encoding data in a format or medium that is conducive to electronic data entry. Barcodes typically consist of various lines, characters, and/or other objects that are arranged together and spaced apart in highly specific configurations. The encoding of barcodes is generally well known in the art and will not be described in detail herein.

Once properly encoded, the barcode can then be printed out onto a label that is preferably robust, such as those comprised of plastic materials. Alternatively, several individual barcode labels could be prepared, e.g., if there are several spaced apart objects (e.g., several solenoids associated with the transmission system). Preferably, the barcode label is printed in PDF417 format, although it should be appreciated that other formats can be used as well in the practice of the present invention. The barcode label can then be affixed (e.g., with an adhesive) to the object of interest, or in proximity to the object of interest, or somewhere in association with the object of interest.

In accordance with a preferred embodiment, the barcode of the present invention is preferably of the two-dimensional (2D) type. The 2D barcode stores data along two dimensions and is therefore capable of containing much more information than conventional one-dimensional (1D) barcode type (e.g., such as those contained on many grocery products) or a magnetic stripe (e.g., such as those contained on credit cards).

Once the barcode label is prepared, it is possible to access the data contained thereon by the data retrieval system, such as but not limited to a scanner and/or the like. The scanner can be mobile, such as a hand scanner, or can be fixed, such as those found in supermarket checkout lanes.

In accordance with a preferred embodiment of the present invention, the data contained on the barcode label is preferably transferred or otherwise transmitted to another data storage device, such as but not limited to the TCU, one of the vehicle's computers (e.g., an ECU), and/or the like. Alternatively, the data contained on the barcode label can preferably be transferred or otherwise transmitted to an intermediate data storage device, such as but not limited to a computer, whereupon the data can be reformatted (e.g., with the aid of a software program) into a format that is understandable by the TCU, one of the vehicle's computers (e.g., an ECU), and/or the like.

The foregoing system is advantageous in that the supplier can perform testing and/or calibration of the solenoids of the transmission modules without the need for having the TCU assembled to the transmission modules. Once the OEM receives the transmission modules with the calibrated solenoids from the supplier, the OEM can then subsequently scan the barcode and program the TCU.

In accordance with another aspect of the present invention, RFID's are employed as the data storage device. These devices preferably employ wireless electronic means that allow communication between a transmitter (e.g., that is typically physically associated with the object such as a transponder or an embedded electronic chip) and a receiver (e.g., an interrogator, scanner, and/or the like) that is typically operable to receive an electronic signal from the transmitter and is generally able to interpret and display information associated with that electronic signal. The encoding of electronic chips is generally well known in the art and will not be described in detail herein.

As with barcodes, the electronic chip can then be affixed to the object of interest, or in proximity to the object of interest, or somewhere in association with the object of interest. Furthermore, several electronic chips could be provided, e.g., if there is not sufficient data capacity on an individual electronic chip.

Once the electronic chip is prepared, it is possible to access the data contained thereon by the data retrieval system, such as but not limited to an interrogator and/or the like. The interrogator can be mobile, such as a hand scanner, or can be fixed.

In accordance with a preferred embodiment of the present invention, the data contained on the electronic chip is preferably transferred or otherwise transmitted to another data storage device, such as but not limited to the TCU, one of the vehicle's computers (e.g., an ECU), and/or the like. Alternatively, the data contained on the electronic chip can preferably be transferred or otherwise transmitted to an intermediate data storage device, such as but not limited to a computer, whereupon the data can be reformatted (e.g., with the aid of a software program) into a format that is understandable by the TCU, one of the vehicle's computers (e.g., an ECU), and/or the like.

As with the previously described system, this system is advantageous in that the supplier can perform testing and/or calibration of the solenoids of the transmission modules without the need for having the TCU assembled to the transmission modules. Once the OEM receives the transmission modules with the calibrated solenoids from the supplier, the OEM can then subsequently interrogate the electronic chip and program the TCU.

In accordance with still another aspect of the present invention, instead of the OEM performing the scanning and/or interrogation of the electronic chip, the TCU can be programmed to automatically perform this task, e.g., when the TCU is assembled to the transmission module containing the solenoids.

In accordance with still yet another aspect of the present invention, a database method can be employed to store the calibration information in a database, such as but not limited to print databases, electronic databases such as virtual databases on the Internet, computer files, and/or the like, and digital databases such as but not limited to CD's, CD-ROM's, DVD's, and/or the like. The preparation of databases, regardless of format, is generally well known in the art and will not be described in detail herein.

Unlike barcodes and electronic chips, databases cannot generally be directly affixed to the object of interest. However, they can be provided in association with the object of interest (e.g., placed in the glove compartment or provided to the supplier and/or OEM).

Once the database is prepared, it is possible to access the data contained thereon by the data retrieval system, such as but not limited to a computer (e.g., if the database is posted on the Internet), a digital media reader (e.g., a CD-ROM reader), and/or the like. The supplier, OEM, or service technician can easily read print versions of the database.

In accordance with a preferred embodiment of the present invention, the data contained in the databases is preferably transferred or otherwise transmitted to another data storage device, such as but not limited to the TCU, one of the vehicle's computers (e.g., an ECU), and/or the like. Alternatively, the data contained in the databases can preferably be transferred or otherwise transmitted to an intermediate data storage device, such as but not limited to a computer, whereupon the data can be reformatted (e.g., with the aid of a software program) into a format that is understandable by the TCU, one of the vehicle's computers (e.g., an ECU), and/or the like.

As with the previously described systems, this system is advantageous in that the supplier can perform testing and/or calibration of the solenoids of the transmission modules without the need for having the TCU assembled to the transmission modules. Once the OEM receives the transmission modules with the calibrated solenoids from the supplier, the OEM can then subsequently consult the databases and program the TCU.

An illustrative methodology of employing the present invention will now be described with reference to FIGS. 1-4, which illustrate various features of several embodiments of a calibration data system, in accordance with the general teachings of the present invention.

Referring specifically to FIG. 1, a solenoid (not shown) is subjected to testing (e.g., a solenoid sweep), such as at a bench station 10. The testing results in a clutch current (expressed in amps) versus pressure (expressed in bar) curve profile as shown generally at 12. This curve can be used to generate or derive a solenoid characteristic curve coefficient, e.g., according to the equation shown. This information can then be used to determine calibration data figures as shown generally at 14. This calibration data preferably relates to the performance characteristics of the solenoid, whether it be a variable force solenoid, a variable bleed solenoid, or any other type of component. It should be appreciated that the calibration data will depend, in part, on the particular design and operation of the solenoid or other component, and thus the calibration data shown is for illustrative purposes only.

Figure 2:
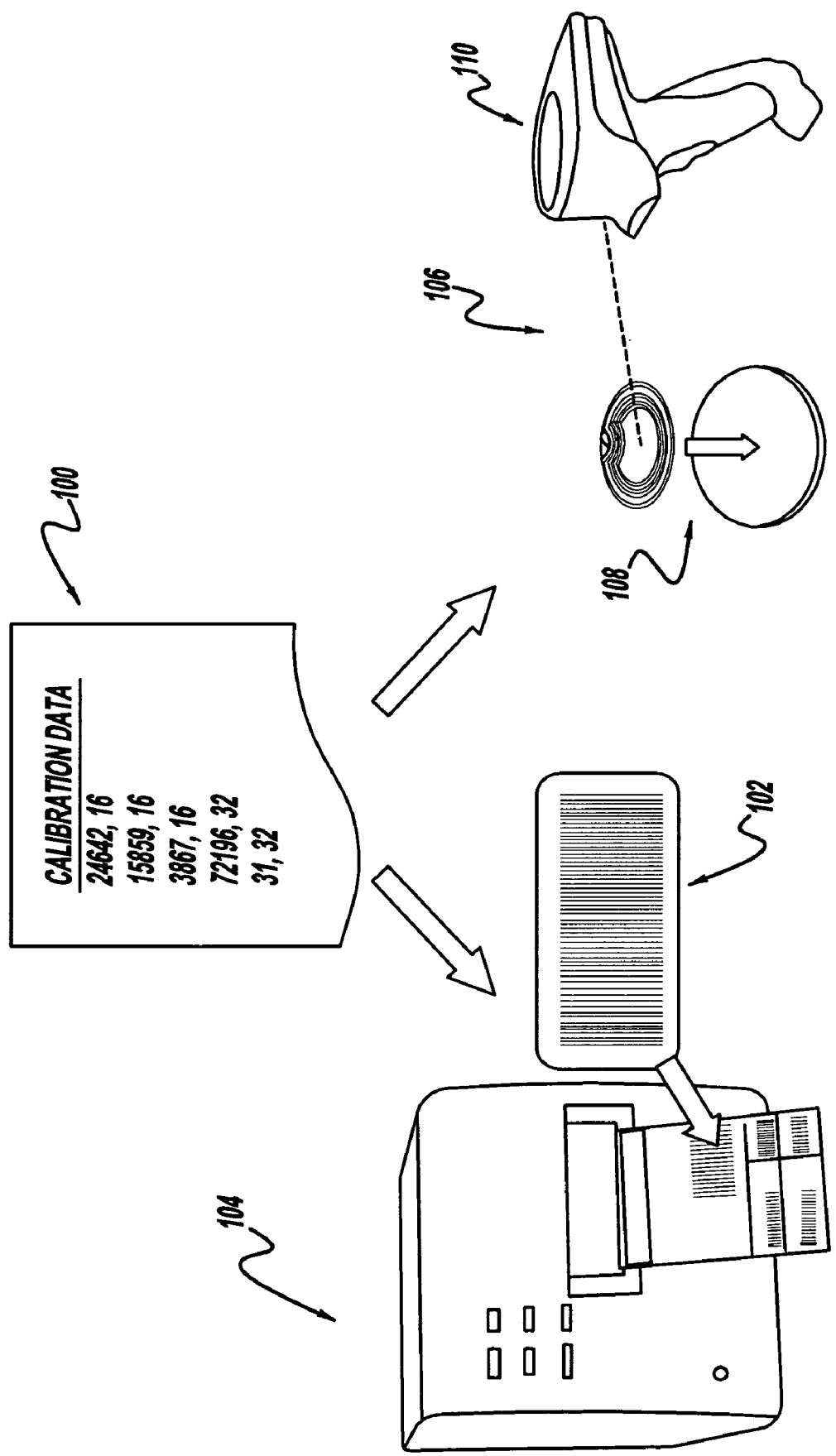
FIG. 2 illustrates the primary aspects of storing calibration data, in accordance with a second embodiment of the present invention.

Referring specifically to FIG. 2, calibration data shown generally at 100 is then entered into a data storage device such as but not limited to a bar code shown generally at 102 (e.g., via a bar code printer 104), an RFID system shown generally at 106 (e.g., including an RFID device 108 and an RFID scanner 110), or the like.

Figure 3:
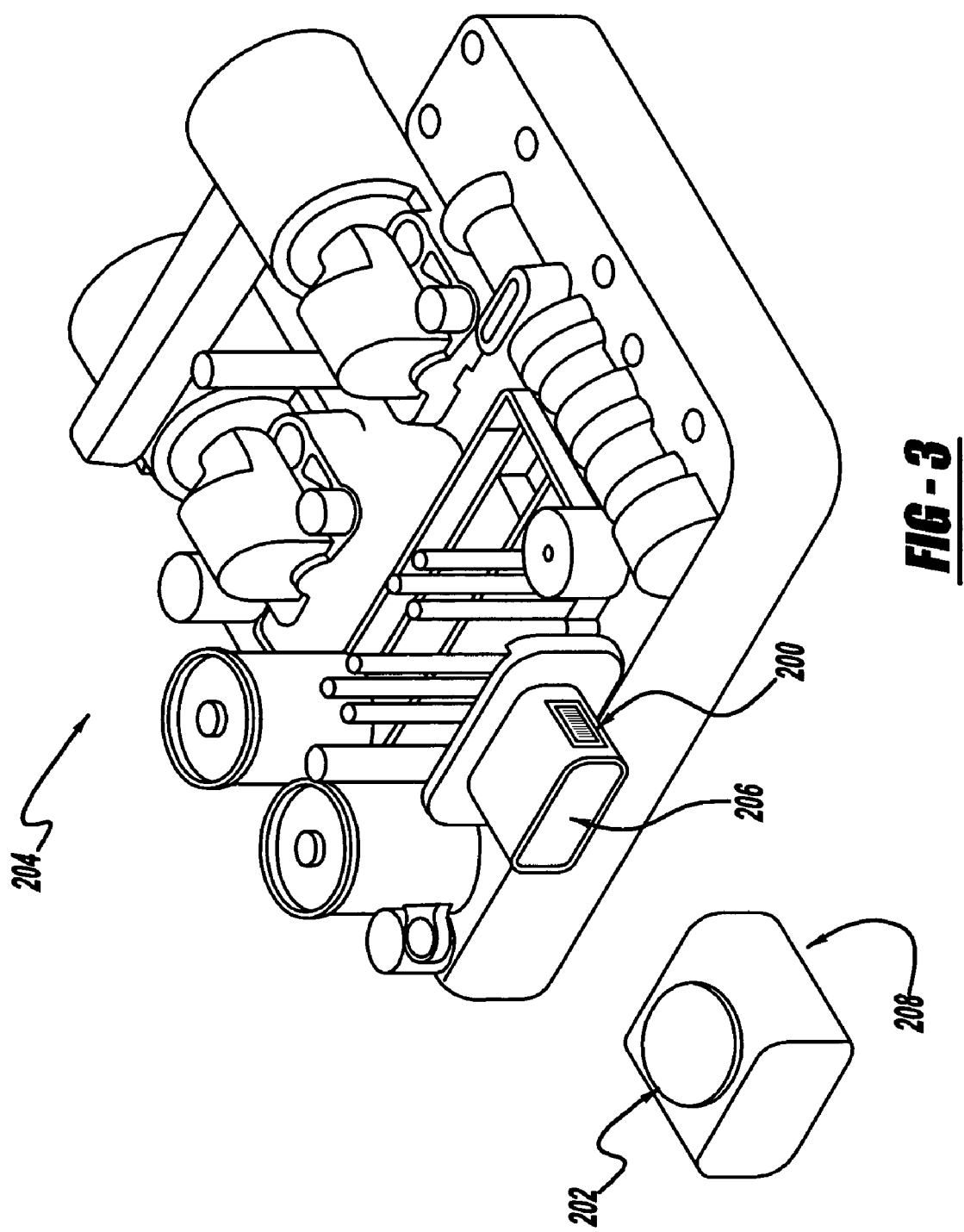
FIG. 3 illustrates the primary aspects of affixing a data storage device to a component of interest, in accordance with a third embodiment of the present invention.

Referring specifically to FIG. 3, the data storage device, e.g., such as but not limited to a bar code shown generally at 200, an RFID device shown generally at 202, or the like, is then physically associated with a component, such as a solenoid assembly 204. By way of a non-limiting example, bar code 200 can be disposed upon a surface of the pass through connector 206 of solenoid assembly 204. By way of another non-limiting example, RFID device 202 can be disposed upon a surface of a cap 208 of solenoid assembly 204.

Figure 4:
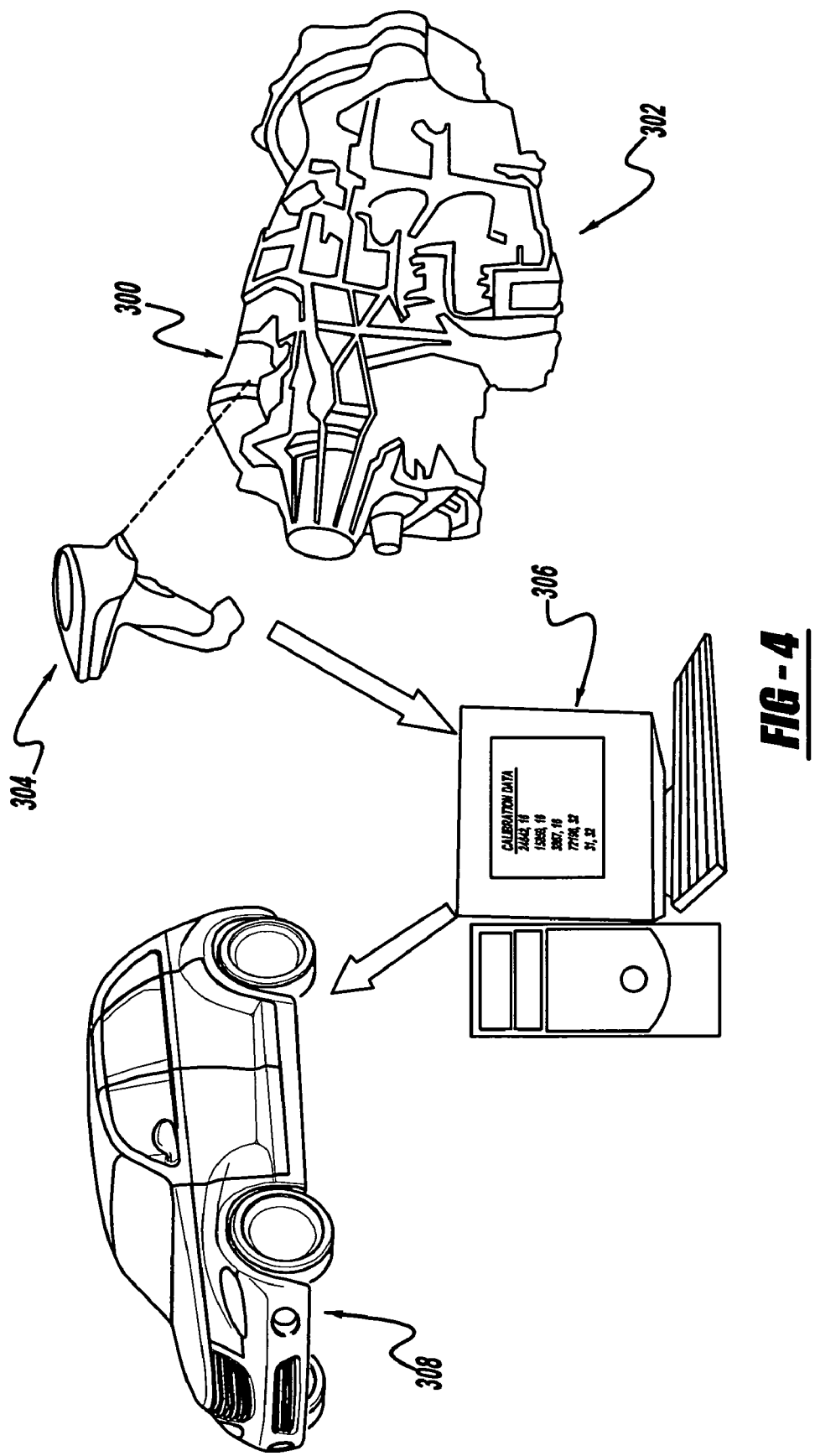
FIG. 4 illustrates the primary aspects of retrieving calibration data, in accordance with a fourth embodiment of the present invention.

Referring specifically to FIG. 4, the data storage device, e.g., such as but not limited to an RFID device shown generally at 300, or the like, which is physically associated with a transmission system 302, is then interrogated for example by an RFID scanner 304. The interrogation determines the calibration data of the solenoid (not shown) can then be displayed for example on a computer screen 306. Once the manufacturer or other party determines that the solenoid complies with the corresponding calibration data, the component, in this case transmission system 302, which includes the solenoid, can be incorporated or installed into another component, such as but not limited to a vehicle 308.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A calibration data transfer system, comprising:
   a first data storage device associated with a solenoid having a pass through connector, wherein the data is used with an equation for creating at least one characteristic curve coefficient of the solenoid, the data is obtained by a solenoid sweep of said solenoid, and said first data storage device is disposed on a surface of said pass through connector;
   a data retrieval system for retrieving the at least one characteristic curve coefficient from the solenoid; and
   a second storage device operable for receiving the at least one characteristic curve coefficient from the data retrieval system and storing the at least one characteristic curve coefficient.

2. The invention according to claim 1, wherein the first data storage device is selected from the group consisting of barcodes, radio frequency identification devices, digital data storage devices, databases, and combinations thereof.

3. The invention according to claim 1, wherein the at least one characteristic curve coefficient is a solenoid characteristic curve coefficient.

4. The invention according to claim 1, wherein the solenoid is selected from the group consisting of variable force solenoids, variable bleed solenoids, and combinations thereof.

5. The invention according to claim 1, wherein the solenoid is physically associated with a transmission system.

6. A calibration data transfer system, comprising:
   a first data storage device associated with a solenoid having a pass through connector, wherein the data is used with an equation for creating at least one characteristic curve coefficient of the solenoid, the data is obtained by a solenoid sweep of said solenoid, and said first data storage device is disposed on a surface of said pass through connector;
   a data retrieval system for retrieving the at least one characteristic curve coefficient from the device; and
   an electronic control unit operable for receiving the at least one characteristic curve coefficient from the data retrieval system and storing the at least one characteristic curve coefficient, said electronic control unit operable for controlling the operation of said solenoid using said characteristic curve coefficient;
   wherein the data storage device is selected from the group consisting of barcodes, radio frequency identification devices, digital data storage devices, databases, and combinations thereof.

7. The invention according to claim 6, wherein the characteristic curve coefficient is a solenoid characteristic curve coefficient.

8. The invention according to claim 6, wherein the solenoid is selected from the group consisting of variable force solenoids, variable bleed solenoids, and combinations thereof.

9. The invention according to claim 6, wherein the solenoid is physically associated with a transmission system.

10. A method for transferring calibration data, comprising:
    providing a first data storage device associated with a solenoid having a pass through connector, wherein the data is used with an equation for creating at least one characteristic curve coefficient of the solenoid, the data is obtained by a solenoid sweep of said solenoid, and said first data storage device is disposed on a surface of said pass through connector;
    providing a data retrieval system for retrieving the at least one characteristic curve coefficient from the device; and
    providing a second storage device operable for receiving the at least one characteristic curve coefficient from the data retrieval system and storing the at least one characteristic curve coefficient;
    performing testing and/or calibration on said solenoid to create said at least one characteristic curve coefficient;
    storing said at least one characteristic curve coefficient on said first data storage device;
    retrieving said at least one characteristic curve coefficient using said data retrieval system;
    retrieving said at least one characteristic curve coefficient from said data retrieval system and storing said at least one characteristic curve coefficient on said second storage device.

11. The invention according to claim 10, wherein the at least one characteristic curve coefficient is a solenoid characteristic curve coefficient.

12. The invention according to claim 10, wherein the first data storage device is selected from the group consisting of barcodes, radio frequency identification devices, digital data storage devices, databases, and combinations thereof.

13. The invention according to claim 10, wherein the solenoid is selected from the group consisting of variable force solenoids, variable bleed solenoids, and combinations thereof.

14. The invention according to claim 10, wherein the solenoid is physically associated with a transmission system.

* * * * *